(No Model.) 2 Sheets—Sheet 1.

A. J. MOXHAM.
METHOD OF WELDING METAL.

No. 495,989. Patented Apr. 25, 1893.

WITNESSES:
Francis P. Reilly
W. F. Brückel

INVENTOR
A. J. Moxham
BY
ATTORNEY.

THE NORRIS PETERS CO., PHOTO-LITHO., WASHINGTON, D. C.

(No Model.) 2 Sheets—Sheet 2.
A. J. MOXHAM.
METHOD OF WELDING METAL.
No. 495,989. Patented Apr. 25, 1893.
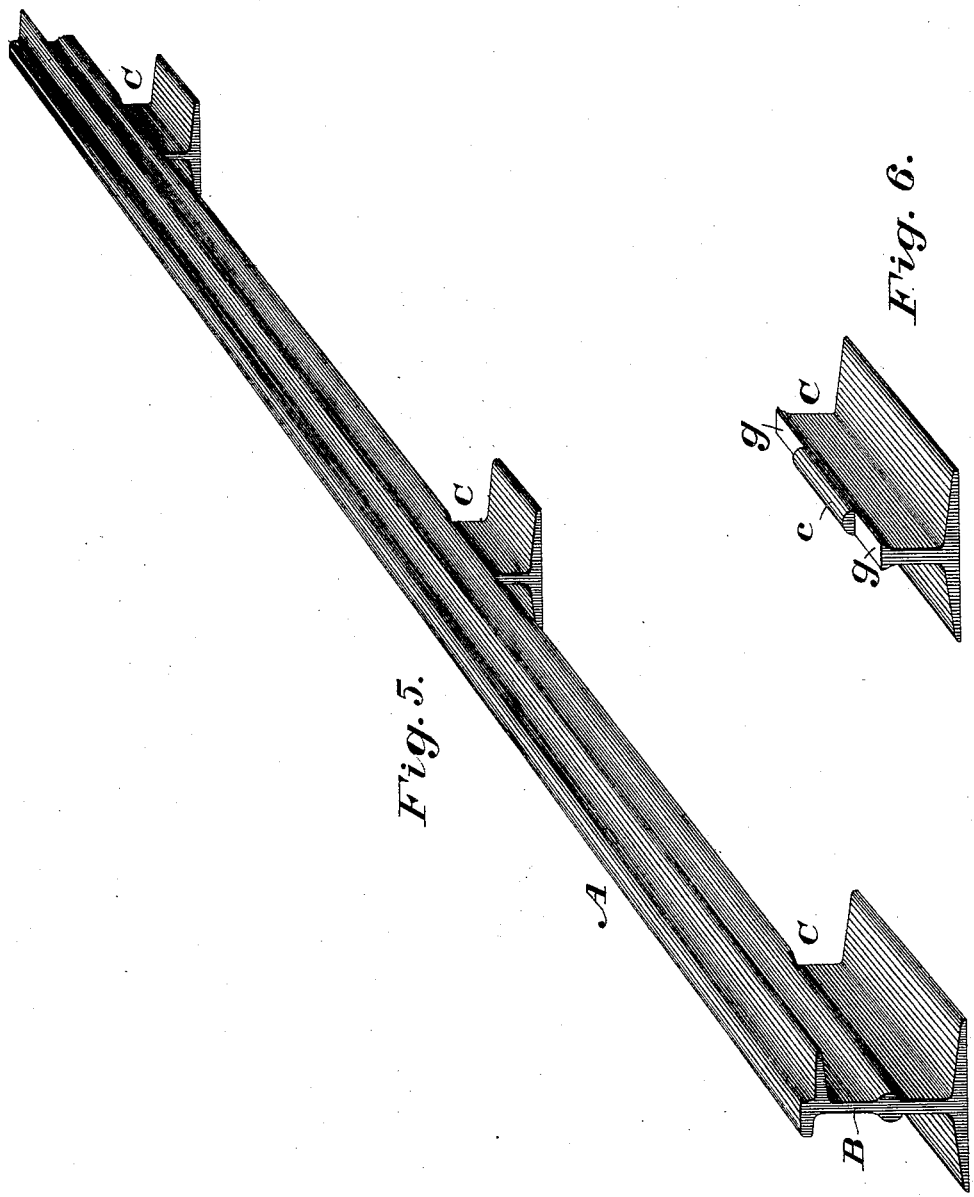

UNITED STATES PATENT OFFICE.

ARTHUR J. MOXHAM, OF JOHNSTOWN, PENNSYLVANIA.

METHOD OF WELDING METAL.

SPECIFICATION forming part of Letters Patent No. 495,989, dated April 25, 1893.

Application filed June 16, 1892. Serial No. 436,896. (No specimens.)

*To all whom it may concern:*

Be it known that I, ARTHUR J. MOXHAM, of Johnstown, in the county of Cambria and State of Pennsylvania, have invented a new and useful Process of Integrally Uniting Pieces of Metal, which invention is fully set forth and illustrated in the following specification and accompanying drawings.

In the operation of welding, if the welding point of heat is located on any exposed edge of the structure welded, the treatment is liable to induce heat-cracks on this edge, which induce weakness in the structure, particularly if the material is of steel; but if this portion is entirely surrounded by material which is not acted upon during the welding operation, as will be hereinafter described, the starting point of the weakness is thus removed from the place or edge where it might do harm, to a place where its presence can do no harm, and it is further protected by an envelope of surrounding material.

My improved method, therefore, consists essentially in surrounding the point of union of the two pieces of metal with material, which is not directly acted upon during the welding operation, so that in the completed, united structure, instead of having the metal which has been acted upon during the welding operation at the surface, I have the same surrounded by material upon which no welding action has taken place.

The essential point being to prevent the welding heat reaching the edges of the areas or surfaces being united, I preferably carry out my improvement by providing one of the parts, which is to be united, with a recess or pocket at the welding point to receive the other parts so that when the two pieces have been welded together at the bottom of this recess or pocket the walls of the pocket which have not been brought to such a high heat may be closed around the inserted piece. In this way the weld is removed from any terminal or exposed point and is confined to the interior of the structure.

I will describe my invention more particularly with reference to the union of a rail and its supports, so as to form an integral structure.

Figure 1:
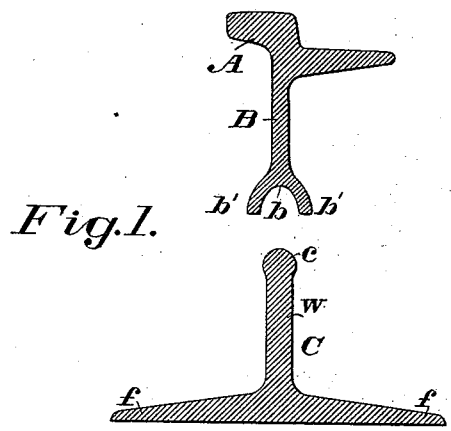
Figure 4:
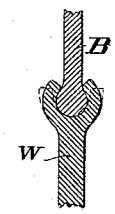
Figure 2:
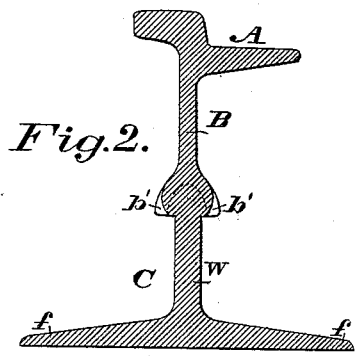
Figure 3:
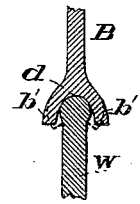

In the accompanying drawings: Figure 1, shows in cross-section, separate from each other, a rail and support embodying my invention. Fig. 2, shows said rail and support united, as hereinafter described. Fig. 3, shows a portion of said rail and support, illustrating the appearance of the parts before the process herein described has been entirely completed. Fig. 4, shows, in cross-section, a modified form in which my invention may be applied. Fig. 5, shows, in perspective, a rail having supports united to it at intervals and embodying my invention. Fig. 6, is a view in perspective of a support showing a certain detail hereinafter described.

In said figures the several parts are respectively indicated by reference letters as follows:

The letter A indicates a railroad rail having a web B and a bifurcation, or downwardly extending flanges, $b'$, at the bottom of said web, between which flanges is the groove or channel $b$.

The letter C indicates a base or support having base flanges $f$, a web $w$, and a bead or projection $c$, at the top of said web.

The process of uniting the rail and support is as follows: The rail and support having been separately rolled or otherwise formed, the bead or head $c$ of the support is inserted in the groove or channel $b$, in the rail, between the flanges $b'$, and the rail and support are then welded together at the bottom of said groove, as shown at $d$, Fig. 3, or otherwise united to form an integral structure. This welding may be accomplished by means of electricity or by any other process or means of welding. When the rail and support have been so welded together, the two flanges $b'$, of the rail which have not been brought to such a high heat are compressed, or forced toward each other, by any suitable mechanical means, so that they will clamp the head $c$ of the base or support, as shown in dotted lines in Fig. 3, and in full lines in Fig. 2. This compression is preferably done immediately after the welding, in which case the flanges $b'$, having been more or less heated during the welding operation, are more readily compressed to grasp the head $c$ of the support, and, by reason of subsequent contraction in cooling, more firmly grasp said inclosed head. The object of this invention would be defeated should the flanges $b'$ be heated to a temperature which would deteriorate the metal as it is only by keeping such exposed points comparatively cool that the heat cracks are prevented and other possible deteriorations are confined to the interior of the structure. It will therefore be readily understood that when the process has been completed, the welded portion of the structure is inclosed by sections of metal which have not been materially affected by the welding operation.

Instead of forming the rail with the flanges $b'$, and the support with the head $c$, the support may be formed with said flanges and the rail with the bead, as shown in Fig. 4.

If desired, a portion of the head of the support may be cut away as shown at $g$, Fig. 6, in order to reduce the area to be welded, which may be advantageous, especially if long supports are used.

It is obvious that the shapes of the upper portion of the rail and the lower portion of the base or support shown may be varied without departing from my invention. And while it is deemed preferable to provide either the rail or support with a bead such as $c$, said bead may be omitted, if desired, in the rolling, and formed by "upsetting" the metal in the process of forging or welding the two parts together; or said bead may be entirely omitted where the metal of the web is of sufficient thickness for good welding.

I do not intend to limit myself to the adoption of this method only to the welding together of rails and their supports, as the same may be used for welding any articles together so as to form an integral structure.

Having thus fully described my said invention, I claim—

1. The hereinbefore described method of welding together two pieces of metal, which consists in forming one of said pieces so that it is provided with a pocket or recess, and then welding said pieces together in said pocket while keeping the surrounding metal at a lower temperature and closing the surrounding metal upon the welded joint.

2. The hereinbefore described method of welding together two pieces of metal, which consists in first forming one of said pieces so as to be provided with flanges or jaws, and the other with a bead or projection adapted to fit between said jaws, then welding the pieces together, while keeping the jaws at a lower temperature, and then closing said flanges or jaws around the welded joint.

3. The hereinbefore described method which consists in first forming a rail and a support separately, one provided with flanges or jaws; then welding said rail and support together, without raising the temperature of the jaws to a welding heat, and then applying pressure to said flanges or jaws to close the same upon the welded joint.

4. The hereinbefore described method which consists in first forming a rail and a support separately, one provided with flanges or jaws and the other with a bead or projecting part adapted to fit between said jaws; then welding said rail and support together, without raising the temperature of the jaws to a welding heat, and then closing said flanges or jaws around the welded joint.

ARTHUR J. MOXHAM.

Witnesses:
A. J. BRYAN,
D. BRYAN.